US012809199B2

(12) United States Patent
Zhu et al.

(10) Patent No.: US 12,809,199 B2
(45) Date of Patent: Nov. 24, 2026

(54) ANTI-PEEPING DISPLAY METHOD COMPRISING A PROGRESSIVE SWITCHING OPERATION AND ANTI-PEEPING DISPLAY DEVICE

(71) Applicant: Coretronic Corporation, Hsin-Chu (TW)

(72) Inventors: Cheng-Wei Zhu, Hsin-Chu (TW); Chin-Lung Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 272 days.

(21) Appl. No.: 18/406,203

(22) Filed: Jan. 7, 2024

(65) Prior Publication Data

US 2024/0241397 A1 Jul. 18, 2024

(30) Foreign Application Priority Data

Jan. 17, 2023 (CN) ......................... 202310070671.4

(51) Int. Cl.
*G02F 1/133* (2006.01)
*G02F 1/137* (2006.01)

(52) U.S. Cl.
CPC .......... *G02F 1/13306* (2013.01); *G02F 1/137* (2013.01)

(58) Field of Classification Search
None
See application file for complete search history.

(56) References Cited

U.S. PATENT DOCUMENTS

| | | | | |
|---|---|---|---|---|
| 2017/0092229 | A1* | 3/2017 | Greenebaum | G09G 5/10 |
| 2020/0341312 | A1* | 10/2020 | Schleder | G02F 1/13306 |
| 2021/0255492 | A1* | 8/2021 | Peng | G02F 1/1323 |
| 2021/0333578 | A1* | 10/2021 | Chen | G02F 1/133738 |

FOREIGN PATENT DOCUMENTS

| | | | |
|---|---|---|---|
| CN | 113589558 | 11/2021 | |
| CN | 113671734 | 11/2021 | |
| CN | 111429855 B * | 3/2022 | G09G 3/36 |
| CN | 115327819 | 11/2022 | |
| TW | I738417 | 9/2021 | |
| WO | 2020140291 | 7/2020 | |

OTHER PUBLICATIONS

"Office Action of Taiwan Counterpart Application", issued on Jan. 23, 2024, p. 1-p. 5.

* cited by examiner

*Primary Examiner* — Paul C Lee
(74) *Attorney, Agent, or Firm* — JCIPRNET

(57) ABSTRACT

An anti-peeping display method and an anti-peeping display device are provided. The anti-peeping display method includes the following. A current display state of the anti-peeping display device is obtained. A designated display state is received and whether the designated display state matches the current display state is determined. In response to a determination result that the designated display state does not match the current display state, the anti-peeping display device is controlled to perform a progressive switching operation.

11 Claims, 3 Drawing Sheets

ANTI-PEEPING DISPLAY METHOD COMPRISING A PROGRESSIVE SWITCHING OPERATION AND ANTI-PEEPING DISPLAY DEVICE

CROSS-REFERENCE TO RELATED APPLICATION

This application claims the priority benefit of Chinese application no. 202310070671.4, filed on Jan. 17, 2023. The entirety of the above-mentioned patent application is hereby incorporated by reference herein and made a part of this specification.

BACKGROUND

Technical Field

The disclosure relates to a method and a display. In particular, the disclosure relates to an anti-peeping display method and an anti-peeping display device.

Description of Related Art

With popularization of mobile devices and wireless networks, people can easily connect to the Internet anytime by operating the mobile devices. Under the case of the convenient operation of the mobile devices, there is a hidden information risk that confidential information is relatively likely to be seen by others. To ensure information security, anti-peeping films have become one of the major options for protecting information security. However, the use of anti-peeping films typically brings various inconveniences such as dimmed brightness, unchangeable viewing angles, or the like.

The information disclosed in this Background section is only for enhancement of understanding of the background of the described technology and As a result it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

According to an embodiment of the disclosure, an anti-peeping display method is adapted to an anti-peeping display device. The anti-peeping display method includes the following. A current display state of an anti-peeping display device is obtained. A designated display state is received and whether the designated display state matches the current display state is determined. In response to a determination result that the designated display state does not match the current display state, the anti-peeping display device is controlled to perform a progressive switching operation.

According to an embodiment of the disclosure, an anti-peeping display device includes an anti-peeping panel, a driving circuit, a power management, and a controller. The anti-peeping panel controls a view angle of the anti-peeping display device. The driving circuit is coupled to the anti-peeping panel. The driving circuit is configured to provide a driving voltage to the anti-peeping panel to drive the anti-peeping panel to control the view angle. The power management circuit is coupled to the driving circuit. The power management circuit is configured to provide a control voltage to the driving circuit to adjust and control the driving voltage. The controller is coupled to the power management circuit. The controller is configured to: obtain a current display state of the anti-peeping display device; receive a designated display state and determine whether the designated display state matches the current display state; and in response to a determination result that the designated display state does not match the current display state, control the power management circuit, such that the anti-peeping display device performs a progressive switching operation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical contents, features and effects of the disclosure may be clearly presented in the following detailed description of one of the preferred embodiments with the reference drawings. The directional terms mentioned in the following embodiments, such as up, down, left, right, front, back, or the like, only refer to the directions of the accompanying drawings. As a result, the directional terms are used for illustrating instead of limiting the disclosure.

Figure 1:
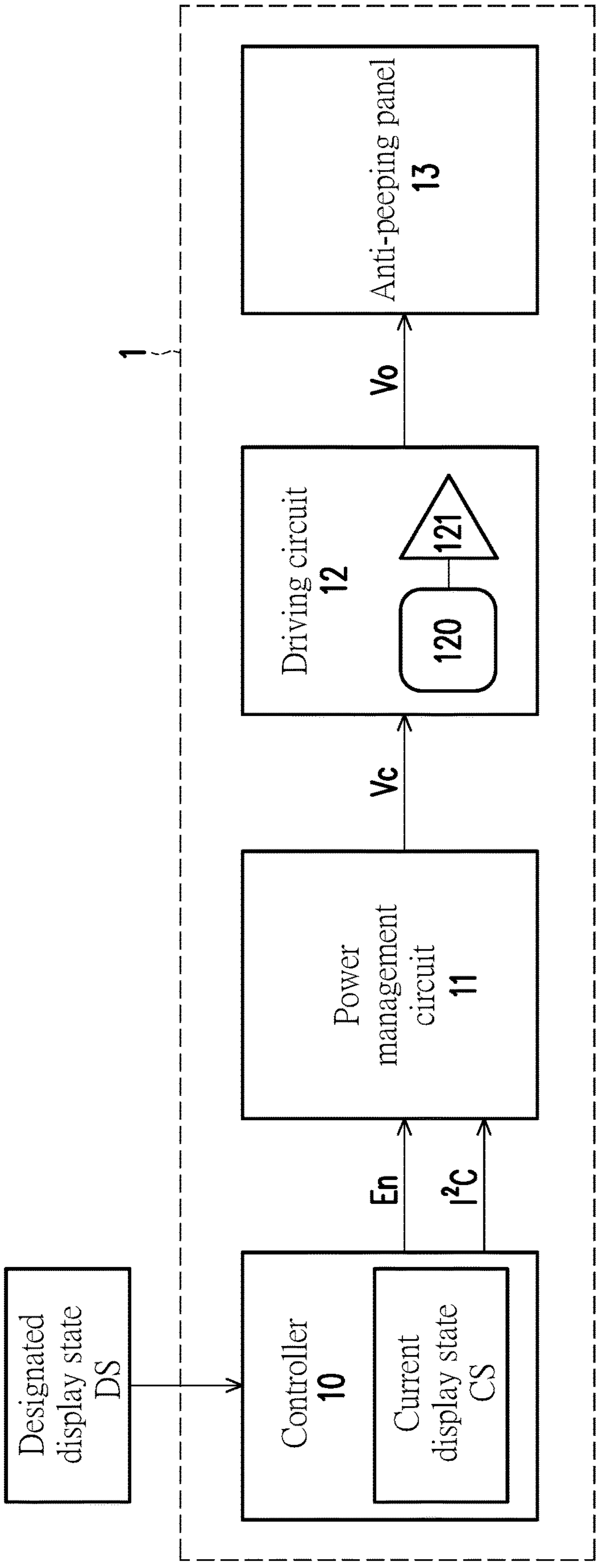
FIG. 1 is a schematic block diagram of an anti-peeping display device of an embodiment of the disclosure.

FIG. 1 is a schematic block diagram of an anti-peeping display device 1 of an embodiment of the disclosure. The anti-peeping display device 1 includes a controller 10, a power management circuit 11, a driving circuit 12, and an anti-peeping panel 13. In general, the anti-peeping panel 13 may correspondingly control a view angle of the anti-peeping display device 1 according to a received control voltage. The driving circuit 12 is coupled to the anti-peeping panel 13, and may be configured to provide a driving voltage to the anti-peeping panel 13, and control the view angle of the anti-peeping display device 1. The power management circuit 11 is coupled to the driving circuit 12, and may be configured to provide a control voltage to the driving circuit to adjust and control the driving voltage provided by the driving circuit 12 to the anti-peeping panel 13. The controller 10 is coupled to the power management circuit 11, and may be configured to control the operation of the power management circuit 11, and adjust and control the view angle of the anti-peeping display device 1.

In an embodiment, the anti-peeping panel 13 may control an emitted light distribution according to the voltage level of a received driving voltage Vo, and make the anti-peeping display device 1 operate in anti-peeping mode or a sharing mode. When operating in the sharing mode, the anti-peeping panel 13 may control the emitted light distribution of the anti-peeping display device 1 to have a full angular range. Specifically, the description that the anti-peeping panel 13 controls the emitted light distribution of the anti-peeping display device 1 to have a full angular range refers to that there will be no substantial changes in the distribution angle range of light rays before passing through the anti-peeping panel 13 and after passing through the anti-peeping panel 13. In other words, the distribution angle range of light rays before passing through the anti-peeping panel 13 and after passing through the anti-peeping panel 13 are substantially the same. For example, the full angular range may be 180° or other large angular ranges where users located within the distribution angle range of light rays in the light emitting direction of the anti-peeping display device 1 may view the displayed image on the screen of the anti-peeping display device 1 in the case where the anti-peeping panel 13 does not limit the emitted light distribution. In addition, when operating in the anti-peeping mode, the anti-peeping panel 13 may limit the emitted light distribution of the anti-peeping display device 1 within a predetermined angular range. More specifically, the predetermined angular range provided by the anti-peeping panel 13 in the anti-peeping mode is less than the full angular range provided in the sharing mode. In this way, when the anti-peeping display device 1 operates in the anti-peeping mode, the anti-peeping display device 1 may provide the displayed image to be viewed by only users located within the predetermined angular range in the light emitting direction of the anti-peeping display device 1, and block the displayed image from being seen by others outside the predetermined angular range, thus improving information security.

For example, the anti-peeping panel 13 may be a liquid crystal panel, and the tilt angle of liquid crystals therein may change according to the driving voltage applied to the anti-peeping panel 13, to change the amount of light emitted by the liquid crystal panel outside a specific angle range. As a result, when operating in the sharing mode, the anti-peeping panel 13 may maintain a light-transmitting emitted light distribution of the anti-peeping panel 13 within the full angular range by receiving a relatively low voltage level (e.g., a ground voltage or a predetermined voltage greater than zero volts) or a floating driving voltage Vo. When operating in the anti-peeping mode, the anti-peeping panel 13 may control the arrangement of liquid crystals by receiving the driving voltage Vo with a relatively high voltage level, to limit the view angle of the displayed image within the predetermined angular range. In other words, light is transmitted only within the predetermined angular range, and light is blocked outside the predetermined angular range, such that users cannot see the displayed image through the anti-peeping panel 13 outside the predetermined angular range.

The power management circuit 11 may provide a control voltage Vc to the driving circuit 12. According to the voltage level of the control voltage Vc, the driving circuit 12 generates a driving voltage Vo with the same voltage level to drive the anti-peeping panel 13. More specifically, the driving circuit 12 includes a regulation circuit 120 and a square wave generating circuit 121. The regulation circuit 120 is coupled between the power management circuit 11 and the square wave generating circuit 121, and may be configured to receive the control voltage Vc provided by the power management circuit 11 to the square wave generating circuit 121, and regulate the control voltage Vc. The regulation circuit 120 may be, for example, a voltage follower (an emitter follower or a source follower), a low-dropout regulator, a regulation circuit based on an amplifier, or the like, as long as it may regulate the control voltage Vc provided by the power management circuit 11 to the square wave generating circuit 121. The square wave generating circuit 121 is coupled between the regulation circuit 120 and the anti-peeping panel 13, and may generate a driving voltage Vo with the same voltage level as the control voltage Vc to the anti-peeping panel 13 according to the control voltage Vc for driving the anti-peeping panel 13. In an embodiment, the driving voltage Vo may be a square wave voltage. In this way, the anti-peeping panel 13 may control the view angle of the anti-peeping display device 1 according to the driving voltage Vo provided by the driving circuit 12.

The controller 10 may receive a designated display state DS input by users to control the anti-peeping display device 1 to operate between the sharing mode and the anti-peeping mode. More specifically, the controller 10 may store a current display state CS (for example, the current display state CS is an anti-peeping state or a sharing state), and receive the designated display state DS input by users, such that the anti-peeping display device 1 performs a progressive switching operation when switching between the sharing mode and the anti-peeping mode. Specifics about the designated display state DS and the current display state CS will be described in detail later.

In an embodiment, when the anti-peeping panel 13 of the anti-peeping display device 1 is a liquid crystal panel, the controller 10 may transmit a setting value control signal $I^2C$ to the power management circuit 11 through an inter-integrated circuit ($I^2C$), such that the power management circuit 11 correspondingly provides a relatively low or relatively high control voltage to the driving circuit 12 to drive the anti-peeping panel 13, such that the anti-peeping display device 1 operates in the sharing mode or the anti-peeping mode. In an embodiment, the controller 10 may not only control the anti-peeping display device 1 to operate in the sharing mode and the anti-peeping mode, but also may execute a progressive switching operation when switching between the sharing mode and the anti-peeping mode. In an embodiment, the controller 10 may designate the control voltage Vc output by the power management circuit 11 through transmitting the setting value control signal $I^2C$.

In general, the controller 10 may control the power management circuit 11 to provide a corresponding control voltage Vc in the sharing mode and the anti-peeping mode. In this way, when executing the progressive switching operation, the controller 10 may change the voltage level of the control voltage Vc provided by the power management circuit 11 to progressively change a transmittance of the anti-peeping panel 13 outside a specific angle range. More precisely, the controller 10 may provide an enabling signal En to the power management circuit 11. The enabling signal En provided by the controller 10 may be continuously maintained at an enabling voltage level, accordingly controlling the power management circuit 11 to continuously operate to receive the setting value control signal $I^2C$ from the controller 10 and output the control voltage Vc corresponding to the setting value control signal $I^2C$ to the anti-peeping panel 13, such that the anti-peeping panel 13 may continuously receive the driving voltage Vo to perform display. As a result, the anti-peeping panel 13 of the anti-peeping display device 1 may receive the driving voltage Vo in whichever of the sharing mode, the anti-peeping mode, or the progressive switching operation, instead of receiving a floating and undefined voltage level in the sharing mode.

In this embodiment, when the anti-peeping panel 13 is realized by a liquid crystal panel, the controller 10 may control the power management circuit 11 to change the provided control voltage Vc with a gradual increase or a gradual decrease. For example, when the anti-peeping display device 1 is to switch from the sharing mode to the anti-peeping mode, the controller 10 may control the power management circuit 11 through the setting value control signal $I^2C$ to gradually increase the control voltage Vc, such that the anti-peeping panel 13 controls a transmittance of the anti-peeping display device 1 outside the predetermined angular range to gradually decrease. Comparatively, when the anti-peeping display device 1 is to switch from the anti-peeping mode to the sharing mode, the controller 10 may control the power management circuit 11 through the setting value control signal $I^2C$ to gradually reduce the control voltage Vc, such that the anti-peeping panel 13 controls the transmittance of the anti-peeping display device 1 outside the predetermined angular range to gradually increase. In this way, during switching of the anti-peeping display device 1, the amount of light emitted by the anti-peeping display device 1 is perceived as progressively changing by users outside the predetermined angular range, which is relatively comfortable in the visual sense. As a result, discomfort to users caused by a sharp change in the amount of emitted light outside the predetermined angular range can be effectively prevented during display mode switching to the anti-peeping mode and the sharing mode.

Figure 2:
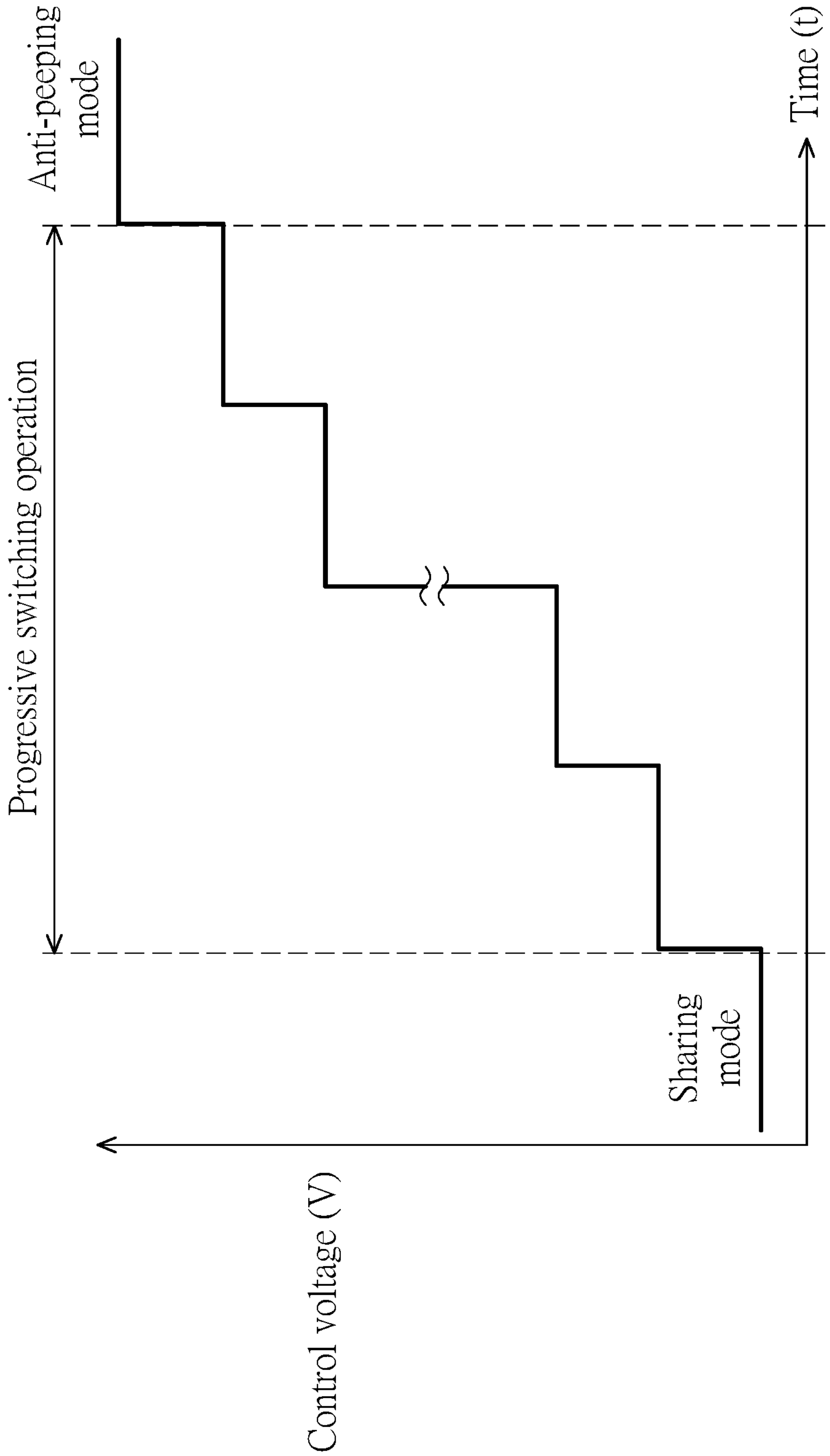
FIG. 2 is a voltage change diagram of a progressive switching operation of an embodiment of the disclosure.

FIG. 2 is a voltage change diagram of a progressive switching operation of an embodiment of the disclosure. FIG. 2 shows the voltage levels of the control voltage Vc operating in a sharing mode, an anti-peeping mode, and a progressive switching operation between them. As shown in FIG. 2, the voltage level of the control voltage Vc operating in the sharing mode is controlled to be lower than the voltage level of the control voltage Vc operating in the anti-peeping mode. As a result, when the progressive switching operation between the sharing mode and the anti-peeping mode is performed, the control voltage Vc may be changed with a gradual increase or a gradual decrease. In an embodiment, the controller 10 controls the power management circuit 11 through the setting value control signal $I^2C$ to change the control voltage Vc provided to the anti-peeping panel 13 by an equal difference or at a fixed rate, to realize the progressive switching operation between the sharing mode and the anti-peeping mode. In an embodiment, the change of the control voltage Vc may not be by an equal difference or at a fixed rate, but a progressive change of the control voltage Vc may correspond to a progressive change in the amount of emitted light of the anti-peeping panel, thus improving comfort of users when viewing.

For example, the controller 10 may be a central processing unit (CPU), or any other programmable general-purpose or special-purpose micro control unit (MCU), a microcontroller, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), any other form of an integrated circuit, a state machine, an Advanced RISC Machine (ARM) based processor, or other similar elements, or a combination thereof. Alternatively, the controller 10 may be a hardware circuit designed through a hardware description language (HDL) or any other digital circuit design well known to those skilled in the art, and implemented through a field programmable gate array (FPGA), a complex programmable logic device (CPLD), or an application-specific integrated circuit (ASIC).

Figure 3:
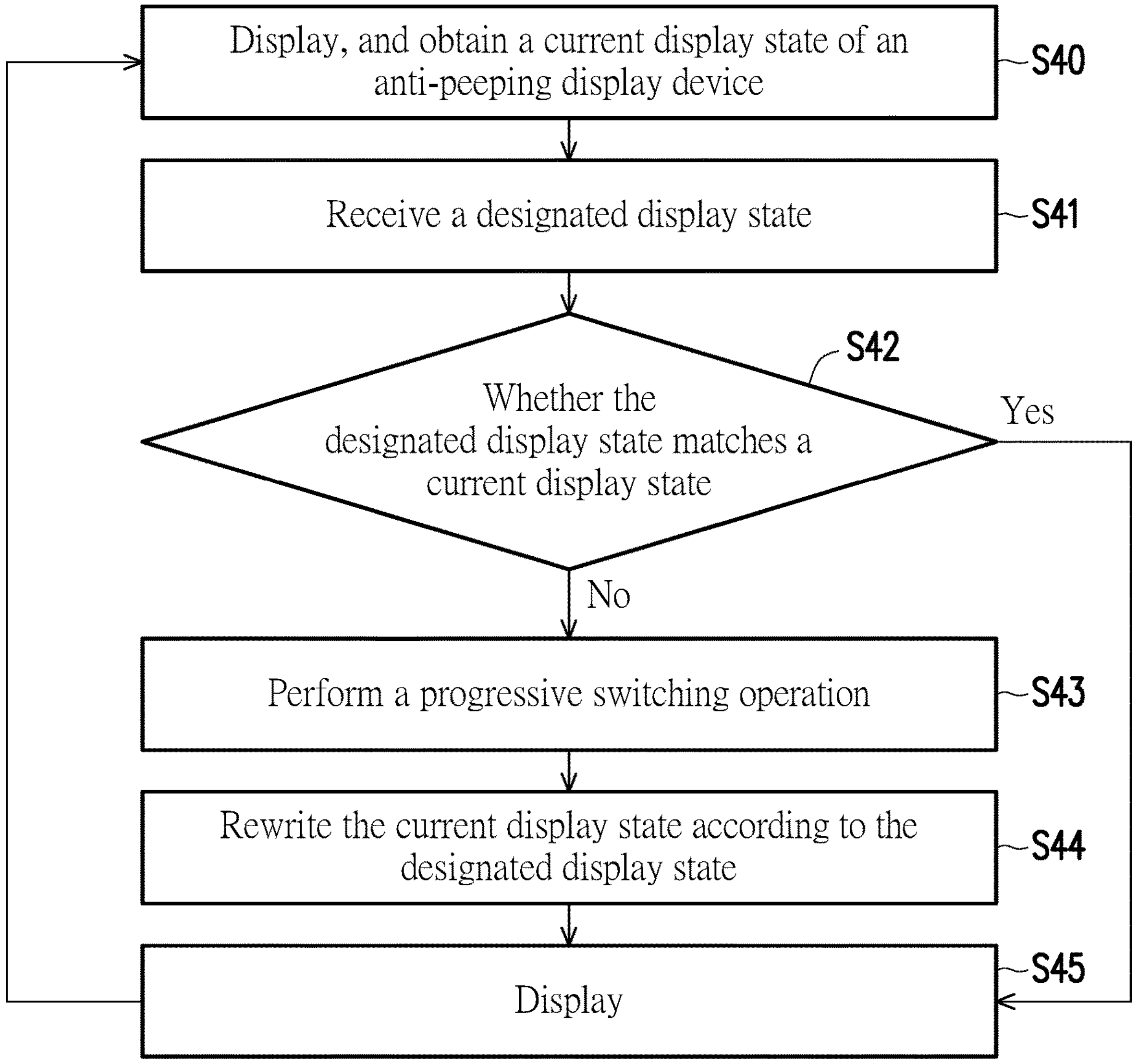
FIG. 3 is a flowchart of an anti-peeping display method of an embodiment of the disclosure.

FIG. 3 is a flowchart of an anti-peeping display method of an embodiment of the disclosure. The anti-peeping display method may be applied to the anti-peeping display device 1 in FIG. 1. The anti-peeping display method includes steps S40 to S45.

In step S40, the controller 10 may obtain a current display state of the anti-peeping display device 1, and control the anti-peeping display device to perform display. Specifically, the current display state CS of the anti-peeping display device 1 may be stored in the controller 10. The controller 10 may generate a corresponding setting value control signal $I^2C$ according to the current display state CS to control the anti-peeping panel 13 to operate in the sharing mode or the anti-peeping mode.

In step S41, the controller 10 may receive the designated display state DS. For example, the controller 10 may receive the designated display state DS provided by users through a human-machine input interface such as a mouse or a keyboard, or through a network.

In step S42, the controller 10 may compare whether the designated display state DS is the same as the current display state CS. When the controller 10 determines that the designated display state DS is the same as the current display state CS, it indicates that the display operation of the anti-peeping display device 1 is not required to be changed, and the process thus enters step S45. Comparatively, when the controller 10 determines that the designated display state DS is different from the current display state CS, it indicates that the display operation of the anti-peeping display device 1 is required to be changed, and the process thus enters step S43.

In step S43, the controller 10 may perform a progressive switching operation. More specifically, the setting value control signal $I^2C$ provided by the controller 10 may correspondingly control the power management circuit 11 to change the control voltage Vc by an equal difference or at a fixed rate, to realize the progressive switching operation between the sharing mode and the anti-peeping mode. In an embodiment, the change of the control voltage may not be by an equal difference or at a fixed rate, but a progressive change of the control voltage may provide a progressive change in the amount of emitted light of the anti-peeping panel, thus improving comfort of users when viewing.

In step S44, after completing the progressive switching operation, the controller 10 may rewrite the current display state CS according to the designated display state DS, and the progress enters step S45 to continue to perform display. After one cycle of steps S40 to S45 is completed, the anti-peeping display device 1 may return to step S40 to execute the next loop to receive control of users to correspondingly switch to the anti-peeping mode and the sharing mode.

In summary of the foregoing, in the embodiment of the disclosure, the anti-peeping display device may provide the progressive switching operation when switching between the anti-peeping mode and the sharing mode to improve information security and also effectively improve comfort of users when viewing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. As a result, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An anti-peeping display method comprising:

obtaining a current display state of an anti-peeping display device;

receiving a designated display state and determining whether the designated display state matches the current display state; and in response to a determination result that the designated display state does not match the current display state, controlling the anti-peeping display device to perform a progressive switching operation, wherein the progressive switching operation comprises:

changing a control voltage provided to an anti-peeping panel of the anti-peeping display device by gradually increasing or gradually decreasing the control voltage in equal steps or at a constant rate.

2. The anti-peeping display method according to claim 1, wherein the current display state is an anti-peeping mode or a sharing mode, wherein when the anti-peeping display device is operated in the anti-peeping mode, an anti-peeping panel of the anti-peeping display device limits an emitted light distribution of the anti-peeping display device within a predetermined angular range, and when the anti-peeping display device is operated in the sharing mode, the anti-peeping panel of the anti-peeping display device controls the emitted light distribution of the anti-peeping display device to have a full angular range, wherein the full angular range is greater than the predetermined angular range, and the anti-peeping panel maintains a predetermined voltage in the sharing mode, wherein the predetermined voltage is greater than 0 volts.

3. The anti-peeping display method according to claim 1, wherein a transmittance of the anti-peeping display device outside a predetermined angular range gradually decreases as the control voltage provided to the anti-peeping panel gradually increases.

4. The anti-peeping display method according to claim 1, further comprising:

in response to the determination result that the designated display state matches the current display state, maintaining a setting control of the anti-peeping display device and performing display.

5. The anti-peeping display method according to claim 1, further comprising:

after the progressive switching operation ends, rewriting the current display state according to the designated display state and storing the current display state.

6. An anti-peeping display device comprising:

an anti-peeping panel, controlled a view angle of the anti-peeping display device;

a driving circuit, coupled to the anti-peeping panel, and configured to provide a driving voltage to the anti-peeping panel to drive the anti-peeping panel to control the view angle;

a power management circuit, coupled to the driving circuit, and configured to provide a control voltage to the driving circuit to adjust and control the driving voltage; and a controller, coupled to the power management circuit, wherein the controller is configured to:

obtain a current display state of the anti-peeping display device;

receive a designated display state and determine whether the designated display state matches the current display state; and in response to a determination result that the designated display state does not match the current display state, control the power management circuit, such that the anti-peeping display device performs a progressive switching operation, wherein the progressive switching operation comprises:

the controller is configured to control the power management circuit to change the driving voltage provided to the anti-peeping panel by gradually increasing or gradually decreasing the control voltage in equal steps or at a constant rate.

7. The anti-peeping display device according to claim 6, wherein the current display state is an anti-peeping mode or a sharing mode, wherein when the anti-peeping display device is operated in the anti-peeping mode, the anti-peeping panel is configured to limit an emitted light distribution of the anti-peeping display device within a predetermined angular range, and when the anti-peeping display device is operated in the sharing mode, the anti-peeping panel is configured to control the emitted light distribution of the anti-peeping display device to have a full angular range, wherein the full angular range is greater than the predetermined angular range, and the anti-peeping panel maintains a predetermined voltage in the sharing mode, wherein the predetermined voltage is greater than 0 volts.

8. The anti-peeping display device according to claim 6, wherein the anti-peeping panel is configured to control a transmittance of the anti-peeping display device outside a predetermined angular range to gradually decrease as the driving voltage provided to the anti-peeping panel gradually increases.

9. The anti-peeping display device according to claim 6, wherein the controller is further configured to:

in response to the determination result that the designated display state matches the current display state, control the power management circuit, maintain a setting control of the anti-peeping display device, and perform display.

10. The anti-peeping display device according to claim 6, wherein the controller is further configured to:

after the progressive switching operation ends, rewrite the current display state according to the designated display state and store the current display state.

11. The anti-peeping display device according to claim 6, wherein the driving circuit further comprises:

a square wave generating circuit, configured to provide a square wave voltage having the driving voltage to the anti-peeping panel; and a regulation circuit, coupled between the power management circuit and the square wave generating circuit, and configured to regulate the control voltage provided by the power management circuit to the square wave generating circuit.

* * * * *